UNITED STATES PATENT OFFICE.

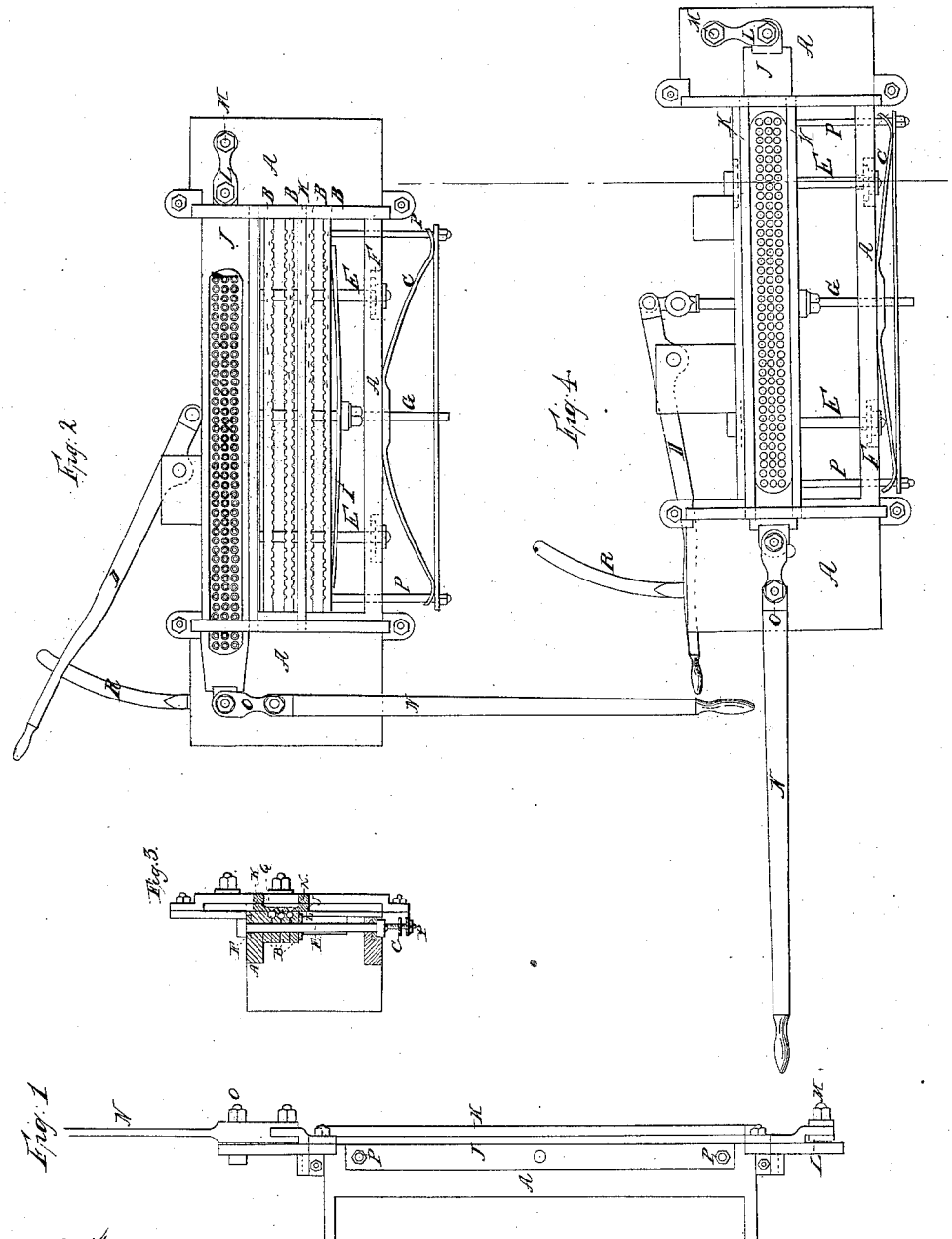

TRISTRAM CAMPBELL AND HENRY B. POORMAN, OF ST. LOUIS, MISSOURI.

IMPROVEMENT IN BULLET-MOLDS.

Specification forming part of Letters Patent No. 16,327, dated January 6, 1857.

*To all whom it may concern:*

Be it known that we, TRISTRAM CAMPBELL and HENRY B. POORMAN, of the city of St. Louis, in the county of St. Louis and State of Missouri, have invented a new and Improved Bullet-Mold; and we do hereby declare that the following is a full, clear, and exact description of the same, reference being had to the annexed drawings, making a part of this specification, in which—

Figure 1 is a longitudinal elevation. Fig. 2 shows a plan when the machine is open. Fig. 3 is a cross-section through A, and Fig. 4 shows a plan of the machine when the molds are closed.

The nature of our invention consists in the mechanical arrangement of the feed and cutter bar, which I term the "trough-knife," with the levers, springs, and rods by which the mold-bars are operated, as will be hereinafter set forth, by which the molds are filled, separated from the waste, and the bullets discharged in a better manner than in ordinary machines of this character.

The construction and operation of our invention are as follows:

A A A is the frame.

B B B B are the mold-bars in which the bullets are cast. The ends of these bars are made to work freely into parallel slots in the frame of the machine, and are connected to each other and to the frame by means of sliding links, so that they can be opened and shut with facility.

E E are the parallel horizontal guides upon which the mold-bars are made to work. Under the heads and nuts of these guides are placed expanding pieces, as shown at F. These pieces are placed into recesses in the frame, so as to fit on their sides or edges, and so as to have end-play, by which the mold-bars are allowed to expand and contract with freedom. The mold-bars are made to open by the action of the spring C, which is connected to them by means of the rods P P, and they are closed by the action of the lever D, which operates upon them through the medium of the rod G, to which it is connected. The spring I is designed to distribute the power applied to the rod G equally along the whole length of the mold-bars, so as to make them close as tight at the ends as in the center.

J is the perforated trough-knife, into which the melted lead is poured, and through which it runs into the molds. There are as many holes in the trough-knife as there are molds in the bars, and each one of them is countersunk in the top, so as to form a sharp edge on the bottom side, thus making this single instrument answer the double purpose of a trough to receive the lead and a knife to separate it from the bullets or shot. The bottom side of the knife is ground to a perfectly smooth surface, and is made to work closely on the top of the molds by the action of the steel bars K K, which are designed to act as springs to keep it down. One end of the trough-knife is attached to the link L, which vibrates around the center M, and the other end is attached to the end of the lever N, which has its fulcrum at O, and by which the knife is worked diagonally over the mold-bars, not on a direct diagonal line, but so that a point on the center of the knife will describe a curve of double curvature across the face of the bars, thus producing a sliding or twisting cut of the knife.

In each one of the mold-bars we make a groove, so that when two bars are put together the grooves shall form a tube the whole length of the bar. This tube is made a short distance below the molds, and communicates with them by a small vent-hole, by which the air escapes when the lead is poured in. The arrangement is shown on the drawings at Q.

Let the machine be in the position shown at Fig. 4, the lead is poured in the trough until the molds are full. The lever N is then brought down to the position shown at Fig. 2, by which the "necks" of the bullets are cut off. The lever D is then detached from a catch on the segment R, and the spring C throws the mold-bars open, which allows the bullets to drop out. The waste lead is then thrown from the trough-knife, and the operation is repeated, and so on. We design using as many mold-bars as in our judgment may be necessary, and of making in them as many molds of such size and shape as we may deem desirable.

We make no claim to the series of parallel mold-bars, as such is not new; neither do we claim the separation of the waste-lead by the movement of the plate through which the molten lead is poured; but

We claim as new and of our own invention—

The mechanical arrangement of the trough-knife J with the lever D, draw-bar G, and springs C and I, operating as hereinbefore set forth.

TRISTRAM CAMPBELL.
    HENRY B. POORMAN.

Witnesses:
 AMOS BROADNAX,
 JAMES CORNWELL.